L. A. UPSON.

MACHINE FOR SCOURING AND CLEANSING WOOLEN YARN.

No. 10,439. Reissued Jan. 29, 1884.

Witness

William McWade

Inventor

Lyman A. Upson

By his attys.

UNITED STATES PATENT OFFICE.

LYMAN A. UPSON, OF THOMPSONVILLE, CONNECTICUT.

MACHINE FOR SCOURING AND CLEANSING WOOLEN YARN.

SPECIFICATION forming part of Reissued Letters Patent No. 10,439, dated January 29, 1884.

Original No. 241,571, dated May 17, 1881. Application for reissue filed October 19, 1883.

*To all whom it may concern:*

Be it known that I, LYMAN A. UPSON, of Thompsonville, in the county of Hartford and State of Connecticut, have invented certain new and useful Improvements in Machines for Washing, Scouring, and Cleaning Woolen Yarn, of which the following is a specification.

Like letters in the figures indicate the same parts.

My improvement relates to machines for scouring and cleaning, and more especially to those adapted for cleaning woolen yarn.

The object of my invention is to perform this operation in a more perfect and thorough manner than has heretofore been done and without injuring the yarn, as is now the case with the machines in common use.

Figure 1:
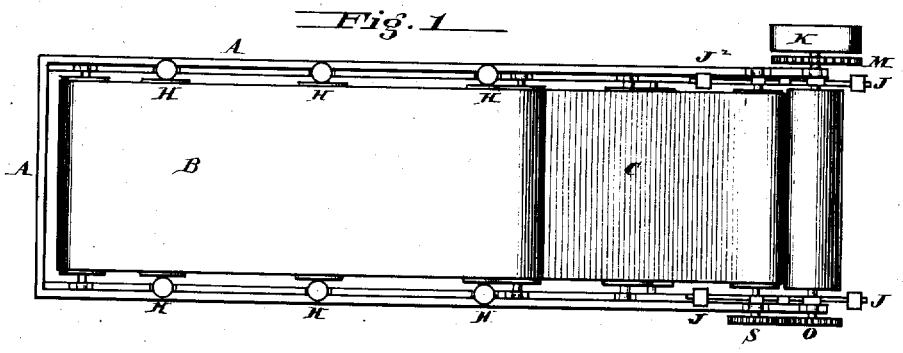
Figure 2:
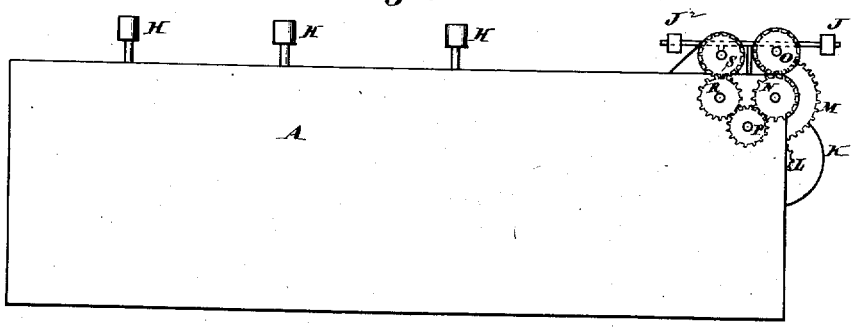
Figure 3:
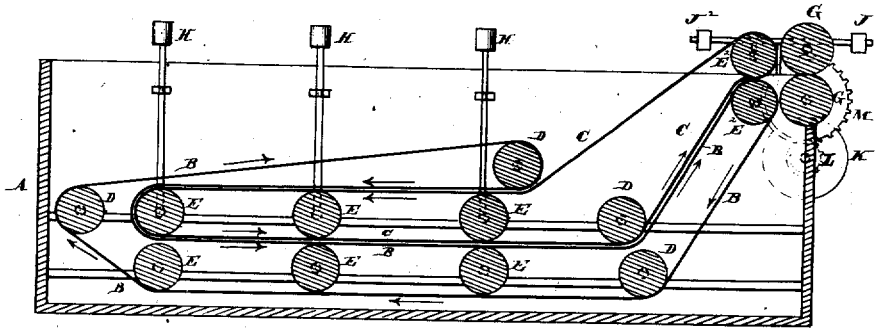

In the accompanying drawings, which illustrate my invention, Figure 1 is a top view of my improved machine. Fig. 2 is a side view of the same. Fig. 3 is a longitudinal vertical section through the middle of the machine, showing the parts beyond.

A is a vat or tank for containing the scouring apparatus and the liquid in which the yarn or other material is to be washed.

B and C are two continuous aprons for carrying the material to be cleaned through the machine. They run in the direction indicated by the arrows in Fig. 3.

D D, &c., are guide-rollers for giving the proper direction to the aprons.

E E are pressure-rollers, serving also to guide the aprons; but their chief object is to press and squeeze the material as it passes between them. The rollers $E^2$ $E^2$, around which the aprons pass, are those from which they receive their motion, and are driven in the direction of the arrows.

G G are two other pressure-rolls, through which the material passes, but which are outside of the line of aprons.

The rollers D and E are all pivoted upon suitable bearings at their ends upon the inside of the vat A. The upper roll of each pair is pressed downward by a weight, H, as shown in the drawings; or the vertical rods may be pressed down by suitable springs in the place of weights. The upper one of each of the pairs of rolls $E^2$ and G may be pressed down by a lever and weight, J $J^2$.

K is the pulley over which the belt passes to drive the machine. Upon it is the pinion L, which gears into the wheel M, attached to the shaft of the lower pressure-roll G. Upon the opposite end of this shaft is the gear-wheel N, which drives the wheel O upon the shaft of the upper roll G. The gear-wheel N also drives the wheels R and S through the intermediate wheel, P, so as to give them the proper direction. These wheels are fixed to the shafts of the rolls $E^2$, and thus drive the aprons, as before described.

The operation of my improved machine is as follows: The tank is filled with the liquid to any desired height above the rolls E, and the machine is set in motion by means of a belt upon the pulley K, so as to move the aprons in the direction of the arrows. The skeins of yarn or other material to be cleaned are laid upon the top of the apron B in succession, and are carried by this apron around the upper roller D, and thence between the two aprons B and C, along the top of the upper rolls E, and then between the pairs of pressure-rolls E. As the skeins successively pass between the rolls E they are pressed with sufficient force to squeeze or wring out the liquid that they absorb in passing through the intervening spaces, and this alternate filling and wringing in the washing-liquid cleans the yarns. The skeins are finally carried up to the rolls $E^2$, where they are delivered by these rolls to the finishing-rolls G, which wring out the remaining liquid and deliver the yarn into a suitable receptacle. If the aprons C and B are made heavy, then little or no pressure would be necessary on the rollers E.

It is evident that my improved machine is applicable to the cleaning and washing of a great many articles requiring such a process; but in the form described it is especially adapted to the cleaning of woolen yarn.

It will be observed that the particular arrangement of guiding and pressure rolls is immaterial, the successive filling and squeezing process and the final wringing being the essential features of my improved machine.

Having now described my invention, what I claim as new, and desire to secure by Letters Patent, is—

1. In a dye-vat, the combination of the wringing-rolls G, with the aprons B and C, the guiding-rolls D, and pressure-rolls E, substantially as set forth.

2. The combination of tank A and wringing-rolls G with guiding-rolls $E^2$ and two endless aprons, guided by suitable rolls to carry said aprons from rolls $E^2$ below the liquid-line, substantially as set forth.

3. The combination of a tank and wringing-rolls with two endless aprons and guides-rolls, to guide said aprons from above the liquid, then below the same, and finally up to but not around the wringing-rolls, substantially as set forth.

4. The combination of a tank and wringing-rolls with two endless aprons, one of which is longer than the other, and guide-rolls for said aprons to guide the longer of said aprons above the liquid, to receive the yarns, &c., and then cause it to pass between said aprons below the liquid, and finally raised by said aprons and fed to the wringing-rolls, substantially as set forth.

5. The combination of the tank A, wringing-rolls G, with aprons B and C, guide-rolls $E^2$, the guiding-rolls, and suitable devices to create a pressure between said aprons, substantially as set forth.

In testimony of which invention I hereunto set my hand.

LYMAN A. UPSON.

Witnesses:
JAMES B. HOUSTON,
FREDERICK E. HUNTER.